INVENTOR.
ROBERT M. DOLL

United States Patent Office 3,467,212
Patented Sept. 16, 1969

3,467,212
BRAKE ACTUATED CONTROL SYSTEM FOR LOCKING DIFFERENTIAL
Robert M. Doll, Detroit, Mich., assignor to Massey-Ferguson Inc., Detroit, Mich.
Filed Mar. 1, 1967, Ser. No. 619,643
Int. Cl. B62d 11/06; F16h 1/44
U.S. Cl. 180—6.2                                   4 Claims

ABSTRACT OF THE DISCLOSURE

A control for a locking differential in a tractor or the like, with a hydraulic valve system which is hydraulically actuated by either brake of a dual brake system so as to automatically unlock the differential upon application of either or both of the brakes.

BACKGROUND OF THE INVENTION

Locking differentials are well known. They are often employed in tractors and similar vehicles in which right-hand and left-hand brakes are used for braking the right-hand and left-hand wheels individually. Such separate braking action is helpful to facilitate sharp turning of the tractor or the like.

If a tractor is equipped with a manually controlled locking differential to overcome a temporary traction difficulty, it can happen that the operator forgets to unlock the differential which he had locked before negotiating a slick spot or the like and therefore cannot turn the tractor at all much less make a short turn by applying one of the two rear wheel brakes.

In an attempt to obviate this difficulty, mechanical linkages have been used with a differential control valve which is biased to unlocked position. The mechanical linkage is arranged to cause the differential to be automatically unlocked when in its locked position by actuation of either one or both of the two brakes.

Since the brake pedals are usually located remotely from the differential control valve, the mechanical linkage must necessarily be both long and include a number of links. These mechanical linkages require accurate adjustment and the provision of lost-motion arrangements.

SUMMARY OF THE INVENTION

In order to provide an interlocking control means for a dual brake system and a locking differential which does not require a mechanical linkage, a fluid system is provided in the present invention which allows actuation of a differential valve by brake application via the brake fluid pressure lines. Depression of either one or both brake pedals of a tractor or similar vehicle leads brake actuating fluid pressure to the differential locking control valve so as to urge it toward the off-position. If the valve is already in the off-position when either brake is applied, the brake actuating fluid pressure on the differential valve has no effect on the same.

DESCRIPTION OF THE PREFERRED EMBODIMENT

Figure 1:
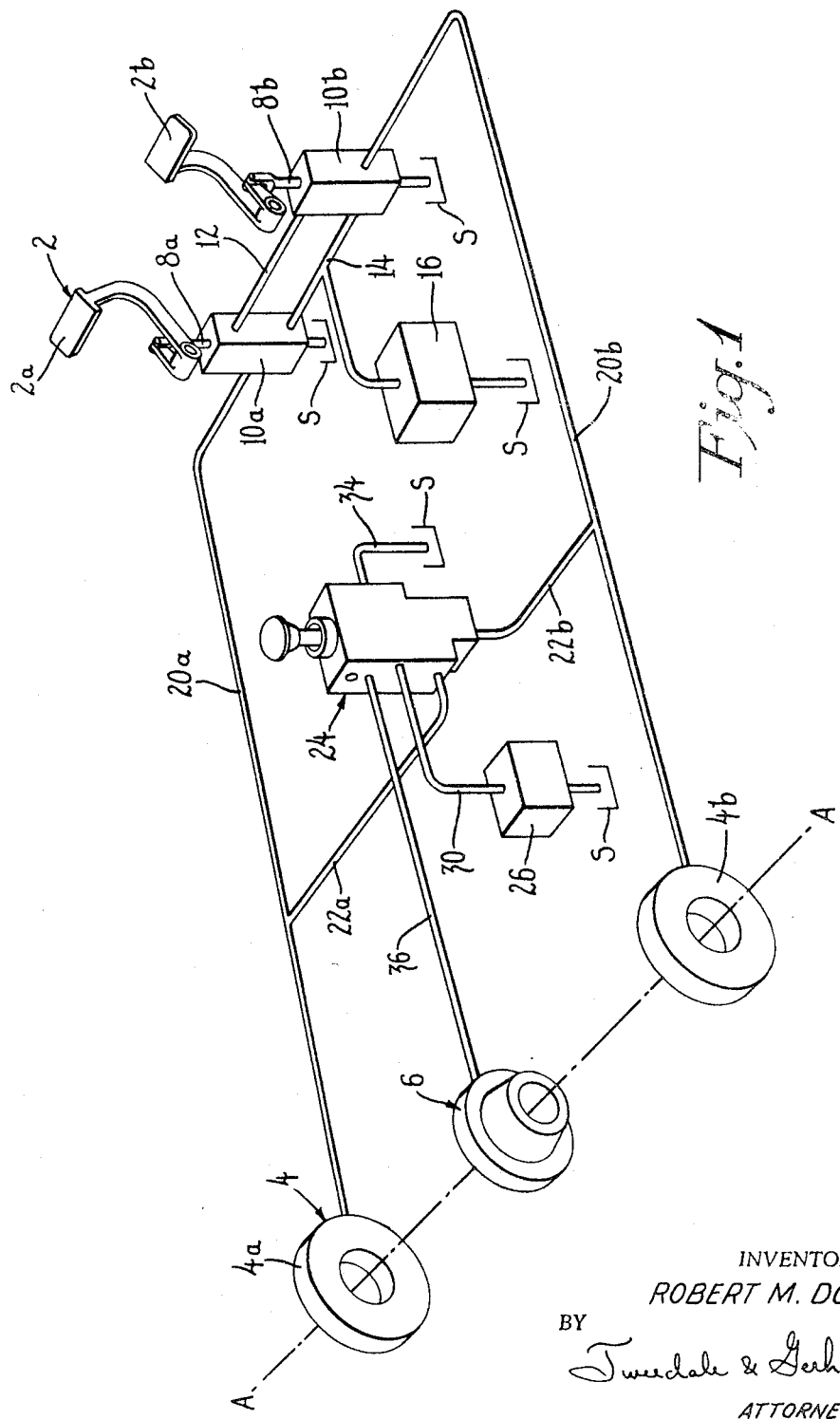
FIG. 1 is a perspective, schematic view of the fluid circuit interconnecting the brake control means, the differential lock control valve, the differential lock, the rear wheel brakes, the pumps and the sumps.

FIG. 1 shows schematically how brake actuating pressure from brake means 2 is not only transferred to wheel brakes 4 but to a differential lock control valve 24 as well.

Two brake pedals 2a, b are provided for controlling the braking of the left-hand brake 4a and the right-hand wheel brake 4b, respectively. Actuation of both brake pedals 2 at the same time has, of course, a uniform braking effect on both wheel brakes 4 simultaneously.

The brake pedals 2a, b are pivoted to push arms 8a and 8b through which movement of the brake pedals is transferred to brake control valves 10a and 10b. These valves are shown as two units in FIG. 1. They can, however, both be arranged together in one housing.

The two brake control valves 10a, b are interconnected by a fluid equalizing passage 12. Another line 14 interconnects the two valves 10 and leads to a pressure supply pump 16.

A hydraulic line 20a connects the brake control valve 10a with the left wheel brake 4a, whereas a hydraulic line 20b leads from the brake control valve 10b to the right wheel brake 4b. Extending from the main brake lines 20 are lines 22a and b which branch off toward and are connected to the differential control valve 24. The differential lock control valve 24 is also connected by a passage 30 with a pump 26 in turn connected to a sump S. Another hydraulic line 36 interconnects the differential 6, arranged on the rear vehicle axis A—A, with the differential lock control valve 24.

Figure 2:
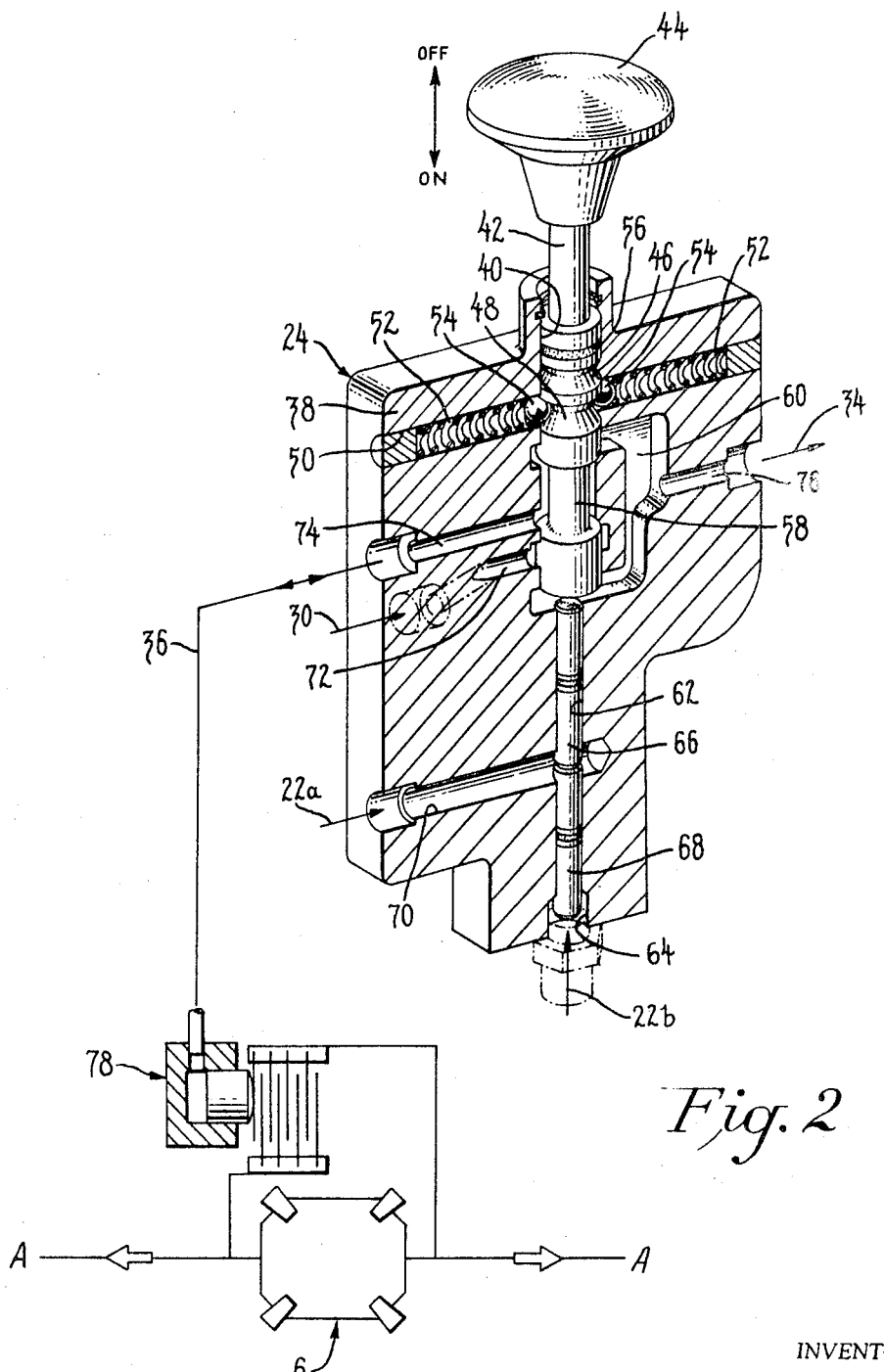
FIG. 2 is a longitudinal section through the differential lock control valve, showing details thereof.

FIG. 2, which is also a schematic arrangement showing only what is necessary to disclose and exemplify the invention, illustrates the details of the differential lock control valve 24. In the upper portion of valve block 38 a first vertical cavity 40 is provided in which a plunger 42 is slidingly arranged. Said plunger is topped by a knob 44 which can be pulled into the upper off-position and pushed into the lower on-position of the differential valve 24.

The plunger 42 has an upper and a lower annular groove 46 and 48, respectively. A horizontal cavity 50 is provided in the upper portion of the differential block 38. Springs 52 which are embedded therein, press detent balls 54 inwardly. The detents 54 yieldingly hold the plunger 42 in either its upper or lower position, depending on the particular annular groove 46 or 48 which has been pushed or pulled into engagement with the spring-biased detents 54.

Above the upper annular groove 46 the plunger 42 is sealed by a sealing ring 56. Between spaced lands on the plunger 42 is a groove portion 58.

A cavity 60 in the valve block 38 reaches from the central portion of the cavity 40 in the valve block 38 in form of a curbed channel toward the lower end of the cavity 40. Below this end there is a second vertical cavity 62 in the block 38 which joins with the lower end of the first cavity 40 and enters the block 38 at port 64. This port connects with the right brake feed line 22b. An upper and a lower piston rod 66 and 68, respectively, are slidingly contained in the second vertical cavity 62. Their function will be described in the paragraph "Operation."

In addition to the two cavities, four channels are leading into or out of the block 38, respectively. A first channel 70 which is connected with fluid line 22a coming from the left brake line 20, leads into the second vertical cavity 62 just where the two rods 66 and 68 meet. A second channel 72 is connected with the pump 26 by fluid line 30. A third channel 74, which extends into the first cavity 40 adjacent the end point of the second channel 72, leads via the fluid line 36 to a multiple disk clutch 78 which acts to lock up the differential 6. A fourth channel 76 leads from the curbed cavity 60 out of the block 38 via fluid line 34 directly to the sump S. All sump means shown schematically in FIG. 1 are indicated collectively by S.

OPERATION

It is assumed that the differential control knob 44 is in its on-position in which the plunger 42 has been pushed down and the detents 54 are in engagement with the upper groove 46. If the operator fails to remember that the differential is locked, depression of either brake pedal 2a or b will lead to unlocking the locked differential 6 by way of releasing the multiple disk clutch 78.

This is accomplished as follows: Upon depression of the right-hand brake pedal 2b, hydraulic fluid in line 20b acts to apply the right-hand brake 4b and, the the same time, via branch fluid line 22b, exerts pressure on the lower piston rod 68 in the valve cavity 62. The pressure on rod 68 acts through upper piston rod 66 on the plunger 42. This upwardly directed movement on the plunger 42 causes the engagement of the detents 54 with the lower groove 48 in the plunger 25 and thus places it in the off-position.

The same result is obtained by depressing the left-hand brake pedal 2a. In this case hydraulic fluid in line 20a acts to apply pressure on the left-hand wheel brake 4a and, at the same time, through branch fluid line 22a on the upper piston rod 66 via channel 70. Thus the rod 66 is moved upwardly in the same manner as both piston rods 66, 68 were moved upwardly upon depression of the right-hand pedal 2b and the same unlocking effect occurs. Piston 68 always acts to separate left-hand brake pressure in channel 70 from the right-hand brake channel 64.

When the differential lock control valve 24 is in its off-position, as shown in FIG. 2, hydraulic fluid coming from the pump 26 through line 30 into the valve block 38 is blocked by the lower land of the plunger 42. This means that no fluid enters the line 36 between the valve 24 and the clutch 78. The multiple disk clutch 78 of the differential 6 is disengaged, and the differential 6 carries out its intended function. Since in the off-position the differential clutch 78 is not under pressure, it is out of engagement and fluid pressure in the line 36 can escape through the channel 74, the groove portion 58 of plunger 42 and from there into the curbed cavity 60 which allows the fluid to return to the sump S via channel 76 and fluid passage 34.

On the other hand, if the plunger 42 in the lock control valve 24 is in its downward, or on-position, fluid pressure from the pump 26 can enter the cavity around the restricted portion 58 of the plunger 42 to pass through channel 74 and fluid line 36 to apply multiple disk clutch 78 of the differential 6 so as to engage the clutch and thus lock the differential.

It will be seen that the invention provides a relatively simple apparatus which requires no adjustment or long linkages and yet is fully effective to accomplish the desired objectives, i.e. to automatically release the differential lock when either or both wheel brakes are applied.

What is claimed is:
1. In a vehicle having a pair of differentially driven output shafts, a wheel brake for each output shaft, a differential lock actuatable to lock the shafts together for non-differential operation, control means for the lock movable between a first position actuating the lock and a second position deactuating the lock, manual operating means for moving the lock control means between the first and second positions, a source of pressure fluid, a fluid pressure responsive brake operator for applying each brake, a fluid circuit interconnecting the brake operators and the source of pressure fluid, and brake control means in said circuit for selectively directing said pressure fluid from the source to either or both of said brake operators to apply the brakes, the improvement comprising: fluid pressure responsive operating means in said circuit and being responsive to operation of the brake control means to apply either or both of said brakes to move the lock control means from first to second positions and deactuate the lock.

2. The vehicle of claim 1, wherein: the fluid pressure responsive operating means comprise a pair of fluid pressure responsive pistons each arranged to move the lock control means, the fluid circuit includes a fluid line interconnecting each of the brake operators with the brake control means, and including means connecting each piston with a fluid line so that movement of each piston is responsive to application of an associated brake.

3. The vehicle of claim 2, wherein: the lock control means include a control valve mounted for reciprocation in a valve body between the first and second positions, and the pistons are mounted in the valve body for movement axially of the valve by the pressure fluid to move the valve.

4. The vehicle of claim 3, wherein the pistons are located coaxially of the valve, one of the pistons being engageable with the valve and the other piston being engageable with the said one piston, movement of the said one piston by pressure fluid effecting movement of the valve and movement of the said other piston by pressure fluid effecting movement of the said one piston to move the valve.

References Cited
UNITED STATES PATENTS

| | | | |
|---|---|---|---|
| 2,793,657 | 5/1957 | McCullough | 251—297 X |
| 2,874,790 | 2/1959 | Hennessey | 74—710.5 X |
| 3,050,165 | 8/1962 | Day. | |
| 3,292,720 | 12/1966 | Harvey | 74—710.5 X |

BENJAMIN HERSH, Primary Examiner

JOHN A. PEKAR, Assistant Examiner

U.S. Cl. X.R.

74—710.5